United States Patent [19]

Taylor et al.

[11] Patent Number: 5,104,755
[45] Date of Patent: Apr. 14, 1992

[54] GLASS-METAL SEALS

[75] Inventors: William J. Taylor, Anoka; Joseph F. Lessar, Coon Rapids; Douglas J. Weiss, Plymouth, all of Minn.

[73] Assignee: Medtronic, Inc., Minneapolis, Minn.

[21] Appl. No.: 612,115

[22] Filed: Nov. 9, 1990

Related U.S. Application Data

[63] Continuation-in-part of Ser. No. 366,430, Jun. 15, 1989, abandoned.

[51] Int. Cl.⁵ .............................................. H01M 2/08
[52] U.S. Cl. .................................. 429/181; 174/50.61
[58] Field of Search ...................... 429/181; 174/50.61

[56] References Cited

U.S. PATENT DOCUMENTS

| | | |
|---|---|---|
| 3,802,875 | 8/1974 | Root et al. |
| 4,168,351 | 9/1979 | Taylor ............... 429/181 |
| 4,233,372 | 11/1980 | Bro et al. ............ 429/181 |
| 4,438,184 | 3/1984 | Chenaux ............. 429/181 |
| 4,587,144 | 5/1986 | Kellerman ........... 429/181 |
| 4,609,598 | 9/1986 | Tucholski et al. ... 429/181 |
| 4,792,503 | 12/1988 | Eppley ............... 429/181 |
| 4,833,049 | 5/1989 | Teaford et al. ...... 429/181 |

FOREIGN PATENT DOCUMENTS

| | | |
|---|---|---|
| 0262073 | 3/1988 | European Pat. Off. |
| 2056753 | 3/1981 | United Kingdom . |

OTHER PUBLICATIONS

Chemical Abstracts, vol. 99, No. 10, Sep. 19, 1983, p. 281, Abstract No. 75490n, Columbus, Ohio, U.S.; B. V. Cheblukova et al.; "Tellurium-containing glasses for joints with metals".

N.T.I.S. Technical Notes, No. 7, Part C, Jul., 1983, NTN 83-0458, Springfield, Va., U.S.; "Glass for Sealing Lithium cells".

CRC Handbook of Chemistry and Physics, 70th Ed., p. F 137, 1989-90 CRC Press, Boca Raton, U.S.

Extended Abstracts Fall Meeting, vol. 87-2, Oct. 18-23, 1987, p. 41 Honolulu, Hi., S. C. Levy "Reliability of Li/So₂ Cells for Long Life Applications".

Medizintechnik, vol. 24, No. 1, Mar., 1984, pp. 13–17, Berlin, DDR; W. Niemeyer et al.; "Konfektionierung implantierbarer Herzschrittmacher".

Chemical Abstracts, vol. 88, No. 10, Mar. 6, 1978, p. 171, abstract No. 65021u, Columbus, Ohio, U.S., A. I. Kuznetsov et al. "Study of hetrophase interaction of glass S65-1 during sealing with titanium and iron nickel group".

Primary Examiner—Stephen Kalafut
Attorney, Agent, or Firm—Harold R. Patton

[57] ABSTRACT

Boroaluminasilicate glass and blended compositions thereof with aluminasilicate glass as seals in feedthroughs.

24 Claims, 1 Drawing Sheet

GLASS-METAL SEALS

BACKGROUND OF THE INVENTION

1. Field of the Invention

This is a Continuation-in-part of application Ser. No. 07/366,430 filed on June 15, 1989, now abandoned.

This invention relates to glass-metal seals and metal-glass-metal seals, such as those in electrical feedthroughs, commonly incorporated into electrochemical cells for use in aqueous environments; cells such as implantable pulse generators, heart pacemakers and other such medical devices. It is, however, broadly applicable to any sealed device requiring a feedthrough structure. For example, devices used in aerospace applications may require the improved feedthroughs of this invention. Such seals must be hermetic and/or moisture resistant (as to bodily fluids) and/or corrosion resistant. Such devices typically make use of a titanium or titanium alloy container into which an electrical inlet lead, including related feedthrough structure, is incorporated. In its most simple configurations, the sealed inlet arrangement may merely comprise an electrical pin or lead surrounded by the glass and sealed thereto, the glass being positioned within an opening in the container and sealed directly thereto as well (a header arrangement). A titanium surround may be used around an opening when the container is of another material. Other configurations may involve a titanium or titanium alloy sleeve which holds the glass and electrical pin. The sleeve is typically welded into the opening in the device container.

SUMMARY OF THE INVENTION

The teachings of the invention are best realized in the use of Pemco 1409P type glass, herein termed boroaluminasilicate glass, manufactured by the Pemco Products Group of Mobay Chemical Corporation, a division of Bayer USA, Inc., Baltimore, Md., as the sealing insulator in glass/metal seals, feedthroughs and the like. It has been found that this glass readily seals to titanium and its alloys. To increase its corrosion resistance to moisture, which is desirable in many instances, the Pemco 1409P glass composition is preferably modified by blending it with various amounts of a glass known in the art as TA-23, herein termed an aluminasilicate glass. TA-23 glass is manufactured by various sources to composition standards originally established by Sandia National Laboratories.

Lastly, when seals using such glass compositions are formed, the glass tends to attach to the fixturing. This problem is addressed in the invention by incorporating a barrier element of ceramic or a high temperature glass into the seal structure.

DESCRIPTION OF THE PREFERRED EMBODIMENTS

Figure 1:
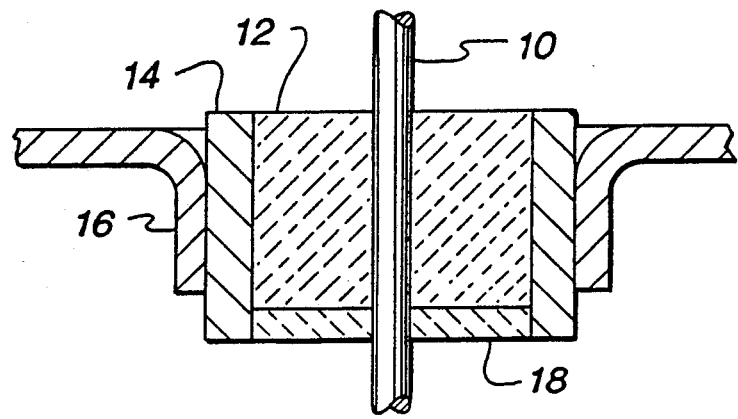
FIGS. 1 and 2 represent in schematic form devices of any of the aforementioned type having a titanium or titanium alloy container and a seal arrangement of the invention.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Figure 2:
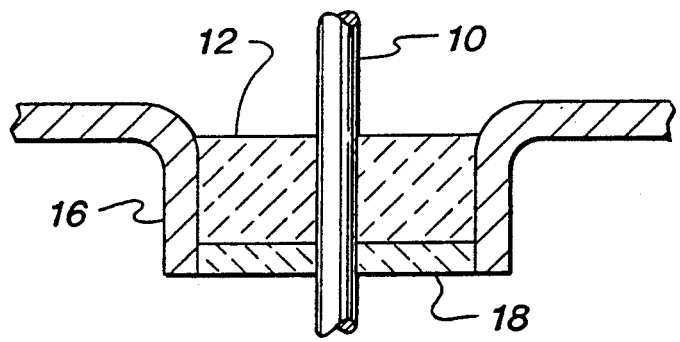

Referring to FIG. 1, a glass-metal seal of the invention, in the form of a feedthrough, is shown. It includes an electrical lead pin 10 sealed to a body of insulating glass 12 held in a titanium or titanium alloy sleeve or ferrule 14 which is welded or otherwise sealed directly into a container 16 of a device of any of the aforementioned types. Titanium alloys such as Ti-6Al-4V, Ti-5Al-2.5 Sn or Ti-6Al-2Cb- 1 TA—1Mo may be used for sleeve 14. Any titanium or titanium alloy may be used in general for the ferrule material. However, Ti-6Al-4V is the preferred material. The term "titanium" is used hereinafter to include titanium and its alloys. Typically, pin 10 (or multiple pins 10—not shown) will be selected from: tantalum, niobium, molybdenum, tungsten, Kovar or an alloy thereof. If desired, the sleeve may be omitted and, in cases where the container is titanium or a titanium alloy, the glass may be sealed directly to it as shown in FIG. 2 in a typical "header" arrangement. A barrier element 18 may be included as well. It is described further hereinbelow. Glass insulator 12 is made into a preform body and then sealed to pin 10 and to sleeve 14, or to the container as already noted, by fusing it in a tooling fixture. Glass 12 consists of Pemco 1409P, having the following nominal composition or equivalent:

| Wt % | | | | |
|---|---|---|---|---|
| $SiO_2$ | $B_2O_3$ | $Al_2O_3$ | MgO | CaO |
| 44 | 29 | 14.4 | 10.4 | 2.2 |

This type of composition has been found to readily seal to titanium or titanium alloys.

To further improve the corrosion or moisture resistance of the glass body 12, the Pemco composition may be blended with a type of aluminasilicate glass as developed by Sandia National Laboratories and known as TA-23 or equivalent, having the nominal composition:

| Wt % | | | | | | | |
|---|---|---|---|---|---|---|---|
| $SiO_2$ | $B_2O_3$ | $Al_2O_3$ | MgO | CaO | SrO | $La_2O_3$ | CoO |
| 44.95 | 8.0 | 20.0 | 7.0 | 12.0 | 6.0 | 2.0 | 0.05 |

Such blended compositions are made into a preform and fused for sealing as already described.

Various blends of the two foregoing glass compositions may be used ranging in wt% from greater than 0% to about 90% TA-23, balance Pemco 1409P blend. A 50%/50% blend is preferred, most preferred is a 70%-80% TA-23, balance Pemco 1409P blend. Sealing glass 12 may also be initially prepared as a discrete overall composition in which the oxide ratios as expressed above are represented.

Manufacturing seals and feedthroughs with these glass compositions is oftentimes difficult because of reaction of the glass to the fixturing. It is typical to make fixturing out of graphite working parts which, in the presence of vapors from titanium and its alloys, causes the glass to attach to the fixturing. Such a fixture is shown schematically in FIG. 3.

Figure 3:
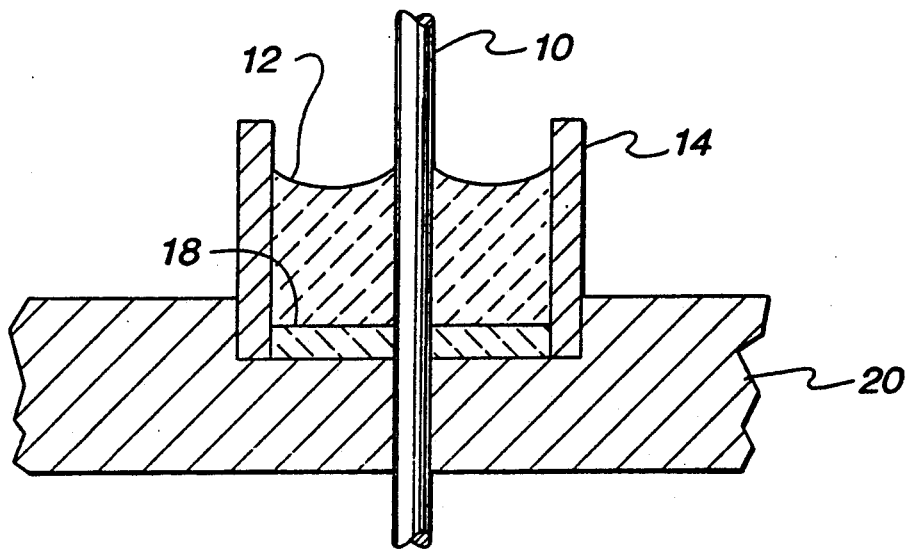
FIG. 3 represents in schematic form a graphite fixture in which a seal of the invention including a barrier element is typically fabricated.

In its most preferred form, a glass-metal seal of the invention will include a ceramic or glass barrier element 18 in the feedthrough structure, which is placed between the glass and the fixture 20, as shown in FIG. 3. It is important that the barrier material selected be compatible as to thermal and chemical stability with the glass insulator 12 preferably having a thermal expansion coefficient substantially matching that of the sealing glass. Mullite ceramic or MP30 high temperature glass are preferred materials for barrier 18. The latter is a proprietary glass composition of a company identified as Electro-Glass Products of Mammoth, PA.

The fixture, with parts arranged as shown in FIG. 3 is placed in an oven and heated to fuse glass 12 to a melting temperature thereby forming a seal with all contacting parts upon cooling. Barrier element 18 being resistant to such temperatures retains its shape and settles into the glass 12.

The specific materials described herein for use with the various structural elements of a feedthrough (lead pin or the like, glass and surrounding header, sleeve or the like) when used in combination provide compatible thermal expansion characteristics overall having unique advantage.

Glass to metal feedthrough seals made with glass compositions ranging in weight percentage from greater than 0% to about 90% TA-23, balance Pemco 1409P blend were prepared and studied for their ability to seal to Ti-6Al-4V ferrules and tantalum pins. Standard sealing processes were utilized to manufacture the glass to metal seals whereby the glass is melted in the seal assembly in temperatures greater than 1000° C.

The following sample combinations were prepared using glass compositions ranging in weight percent from about 0, 2, 5, 10, 20, 30, 40, 50, 60, 70, 80, 90 percent TA-23, balance Pemco 1409P glass. All combinations resulted in a hermetic seal to less than $1.0 \times 10^{-9}$ cc Helium per second. Thermal shock testing of no less than 25 cycles of the glass blends varying in weight percent composition from about 20%–50% TA-23, balance Pemco 1409P resulted in the glass to metal seal maintaining its hermeticity. Said 20%–50% weight glass blend compositions were also immersion tested in 80° C. deionized water and found to maintain their hermeticity to less than $1 \times 10^{-9}$ cc Helium per second, thus illustrating their resistance to moisture in aqueous environments.

This completes the description of the preferred and alternate embodiments of the invention. Those skilled in the art may recognize other equivalents to the specific embodiment described herein, which equivalents are intended to be encompassed by the claims attached hereto.

Having described the invention, the exclusive rights and privileges thereto are to be defined by the following claims in the light of the foregoing description.

What is claimed is:

1. A glass-metal seal comprising a metal and a sealing glass wherein the metal is titanium or one of its alloys and the sealing glass comprises a boroaluminasilicate glass having the following nominal composition: 44% $SiO_2$, 29% $B_2O_3$, 14.4% $Al_2O_3$, 0.4% MgO, 2.2% CaO.

2. The seal of claim 1 wherein the sealing glass includes as blended an amount of aluminasilicate glass, having the following nominal composition in weight percent: 44.95% $SiO_2$, 8.0% $B_2O_3$, 20.0% $Al_2O_3$, 7.0% MgO, 12.0% CaO, 6.0% SrO, 2.0% $L_2O_3$, 0.05% CoO, and comprising about 0% to about 90% by weight of the overall sealing glass composition; the balance consisting essentially of the boroaluminasilicate glass having the following nominal composition in weight percent: 44% $SiO_2$, 29% $B_2O_3$, 14.4% $Al_2O_3$, 10.4% MgO, 2.2% CaO.

3. The seal of claim 2 wherein the aluminasilicate glass comprises about 50% of the overall sealing glass composition.

4. The seal of claim 2 wherein the aluminasilicate glass comprises about 70% to about 80% of the overall sealing glass composition.

5. The seal of claim 2 including a barrier member adjacent a portion of the sealing glass which would normally have contacted the fixture during fabrication and having a thermal expansion coefficient substantially matching the thermal expansion coefficient of the sealing glass, wherein the barrier member is glass or ceramic.

6. The seal of claim 5 wherein the ceramic barrier is mullite.

7. In a electrochemical cell of the type including a feedthrough opening in the cell container, the cell including:
   a metallic portion at least around the opening consisting essentially of titanium or one of its alloys;
   an electrical lead extending through the opening, and
   a glass insluator, sealingly surrounding the lead and sealingly contacting the metallic portion of the container to provide a hermetic, moisture-resistant seal in the opening, the glass comprising of a boroaluminasilicate glass having the following nominal composition in weight percent: 44% $SiO_2$, 29% $B_2O_3$, 14.4% $Al_2O_3$, 10.4% MgO, 2.2% CaO.

8. The cell of claim 7 wherein the metallic portion comprises a sleeve carried in the opening.

9. The cell of claim 8 wherein the container is essentially of the titanium composition.

10. The cell of claim 7 wherein the glass includes as blended an amount of aluminasilicate glass having the following nominal composition in weight percent: 44.95% $SiO_2$, 8.0% $B_2O_3$, 20.0% $Al_2O_3$, 7.0% MgO, 12.0% CaO, 6.0% SrO, 2.0% $La_2O_3$, 0.05% CoO, and comprising from about 0% to about 90% by weight of the overall glass composition; the balance consisting essentially of boroaluminasilicate glass having the following nominal composition in weight percent: 44% $SiO_2$, 29% $B_2O_3$, 14.4% $Al_2O_3$, 10.4% MgO, 2.2% CaO.

11. The cell of claim 10 wherein the aluminasilicate glass comprises about 50% of the overall sealing glass composition.

12. The cell of claim 10 wherein the aluminasilicate glass comprises about 70% to about 80% of the overall sealing glass composition.

13. The cell of claim 10 including a glass or ceramic barrier member adjacent a portion of the sealing glass seal which would normally contact the fixture during fabrication and having a thermal expansion coefficient substantially matching the thermal expansion coefficient of the sealing glass with respect to the sealing glass seal, wherein the barrier member is glass or ceramic.

14. The cell of claim 13 wherein the ceramic barrier is mullite.

15. The cell of claim 7 wherein the material of the lead is selected from the group consisting of tantalum, niobium, molybdenum, tungsten, kovar, and alloys thereof.

16. The cell of claim 7 wherein the container is titanium or a titanium alloy and the glass is sealed directly thereto.

17. In an implantable device having at least one lead extending through a titanium or titanium alloy metallic surround, an improved feedthrough structure including a body comprising a boroaluminasilicate glass having the following nominal composition in weight percent: 44% $SiO_2$, 29% $B_2O_3$, 14.4% $Al_2O_3$, 10.4% MgO, 2.2% CaO.

18. The combination of claim 17 wherein the glass includes as blended an amount of aluminasilicate glass having the following nominal composition in weight percent: 44.95% $SiO_2$, 8.0% $B_2O_3$, 20.0% $Al_2O_3$, 7.0% MgO, 12.0% CaO, 6.0% SrO, 2.0% $La_2O_3$, 0.05% CoO, and comprising from about 0% to about 90% by weight of the overall sealing glass composition; the balance consisting essentially of boroaluminasilicate glass.

19. The combination of claim 17 wherein the lead is of a material selected from the group consisting of tantalum, niobium, molybdenum, tungsten, Kovar, and alloys thereof.

20. A device comprising a container and an external lead extending thereunto through a feedthrough structure, the structure comprising a body comprising a boroaluminasilicate glass having the following nominal composition in weight percent: 44% $SiO_2$, 29% $B_2O_3$, 14.4% $Al_2O_3$, 10.4% MgO, 2.2% CaO, sealed to a titanium surround positioned about an opening in the container, a lead extending through the glass.

21. The combination of claim 20 wherein the glass includes as blended an amount of aluminasilicate glass having the following nominal composition in weight percent: 44.95% $SiO_2$, 8.0% $B_2O_3$, 20.0% $Al_2O_3$, 7.0% MgO, 12.0% CaO, 6.0% SrO, 2.0% $La_2O_3$, 0.05% CoO, and comprising from about 0% to about 90% by weight of the overall sealing glass composition; the balance consisting essentially of boroaluminasilicate glass.

22. The combination of claim 20 wherein the lead is of a material selected from the group consisting of tantalum, niobium, molybdenum, tungsten, kovar, and alloys thereof.

23. The device of claim 20 including a barrier member adjacent a portion of the sealing glass which would normally have contacted the fixture during fabrication and having a thermal expansion coefficient substantially matching the thermal expansion coefficient of the sealing glass, wherein the barrier member is glass or ceramic.

24. The device of claim 23 wherein the ceramic barrier is mullite.

* * * * *

UNITED STATES PATENT AND TRADEMARK OFFICE
CERTIFICATE OF CORRECTION

PATENT NO. : 5,104,755
DATED : April 14, 1992
INVENTOR(S) : William J. Taylor et al It is certified that error appears in the above-indentified patent and that said Letters Patent is hereby corrected as shown below:

Column 3, line 62, "0.4%" should be --10.4%--.

line 67, "$L_2O_3$" should be $La_2O_3$.

Column 4, line 31, after "comprising", [of] should be deleted.

Signed and Sealed this

Sixth Day of September, 1994

BRUCE LEHMAN

Attest:

Attesting Officer

Commissioner of Patents and Trademarks